United States Patent [19]
Crandell

[11] Patent Number: 6,155,815
[45] Date of Patent: *Dec. 5, 2000

[54] BUSHING AND NOZZLE HEATING DEVICE

[76] Inventor: Walter R. Crandell, Duratherm Processing Systems, Inc. 3720 Stern Ave., St. Charles, Ill. 60174

[ * ] Notice: This patent issued on a continued prosecution application filed under 37 CFR 1.53(d), and is subject to the twenty year patent term provisions of 35 U.S.C. 154(a)(2).

[21] Appl. No.: 09/015,121

[22] Filed: Jan. 29, 1998

[51] Int. Cl.[7] .................................................. B29C 45/20
[52] U.S. Cl. ........................................ 425/549; 264/328.15
[58] Field of Search ......................... 425/549; 264/328.15

[56] References Cited

U.S. PATENT DOCUMENTS

| | | | |
|---|---|---|---|
| 4,010,351 | 3/1977 | Williams et al. | 219/523 |
| 4,253,011 | 2/1981 | Hinz | 219/421 |
| 4,492,556 | 1/1985 | Crandell | 425/549 |
| 4,882,469 | 11/1989 | Trakas | 425/549 |
| 5,052,100 | 10/1991 | Trakas | 425/549 |
| 5,147,663 | 9/1992 | Trakas | 425/549 |
| 5,180,594 | 1/1993 | Trakas | 425/549 |
| 5,235,737 | 8/1993 | Gellert | 425/549 |
| 5,474,440 | 12/1995 | Gellert | 425/549 |
| 5,507,636 | 4/1996 | Gellert | 425/549 |

*Primary Examiner*—Jill L. Heitbrink
*Attorney, Agent, or Firm*—Martin Faier; Faier & Faier P.C.

[57] ABSTRACT

An integral heated molding device for maintaining at a controlled elevated temperature material passing through an orifice in the device, which has a heat transfer central core secured to an overlying cover and having an annular space between the central core and cover containing a resistance wire wound ceramic core embedded and compacted in heat transfer electrical insulation material, with leads connecting the wire wound core to a source of power exiting from the device remote from the orifice. The invention also includes steps for making such a heated molding nozzle or bushing device.

25 Claims, 4 Drawing Sheets

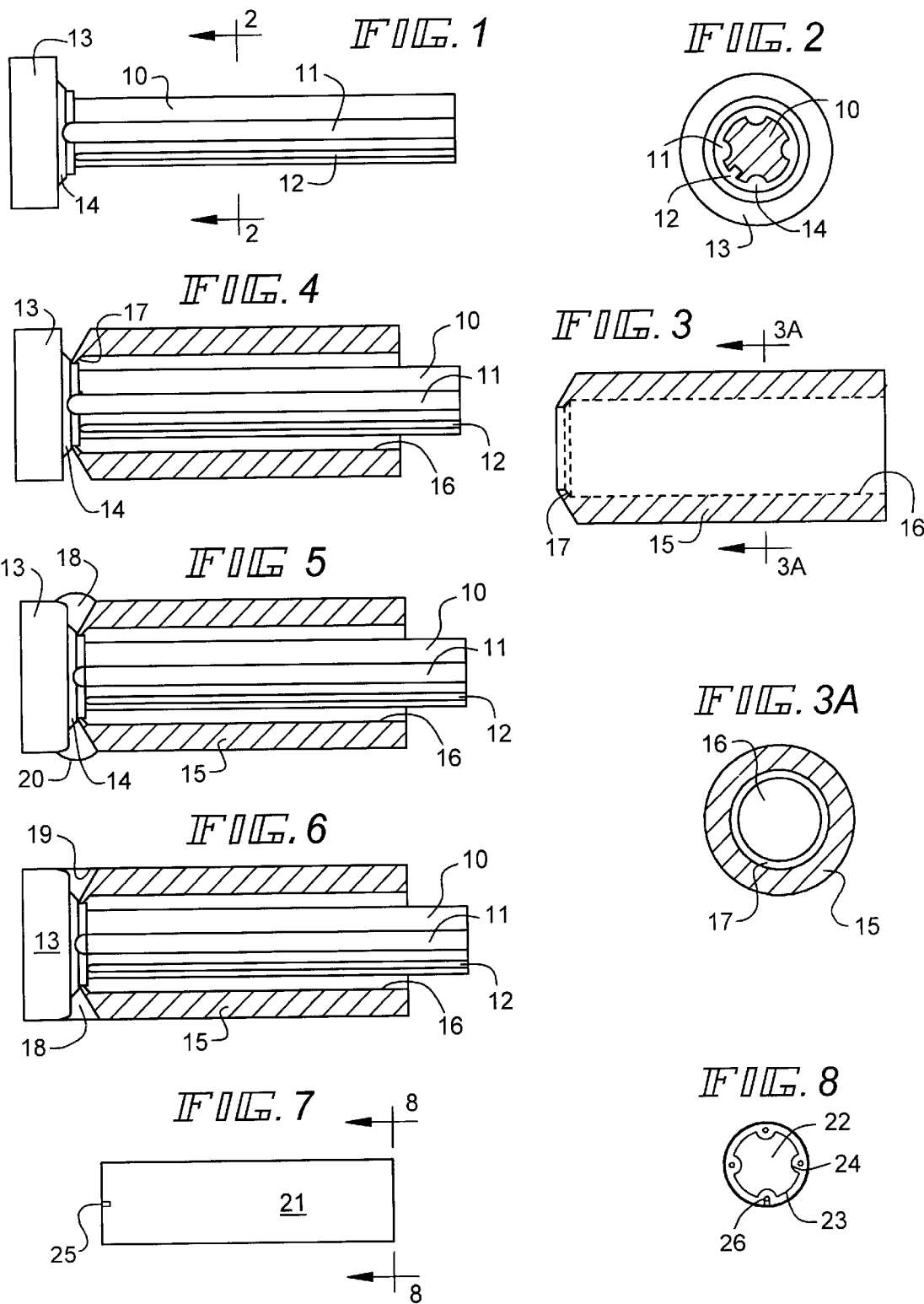

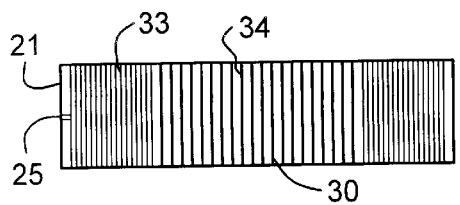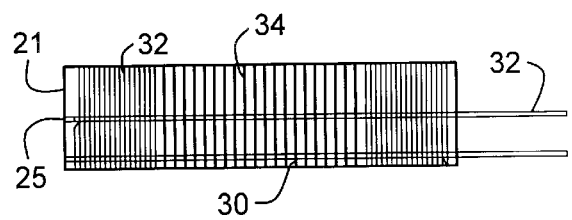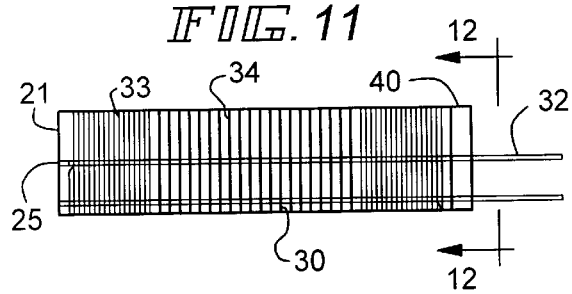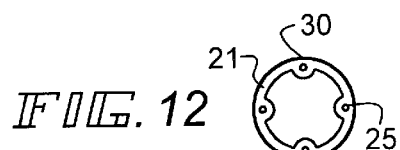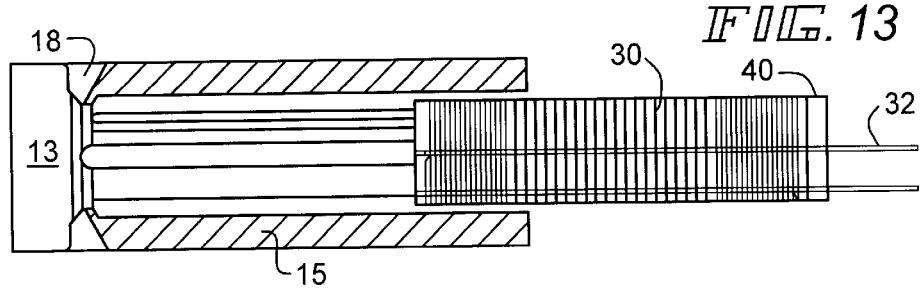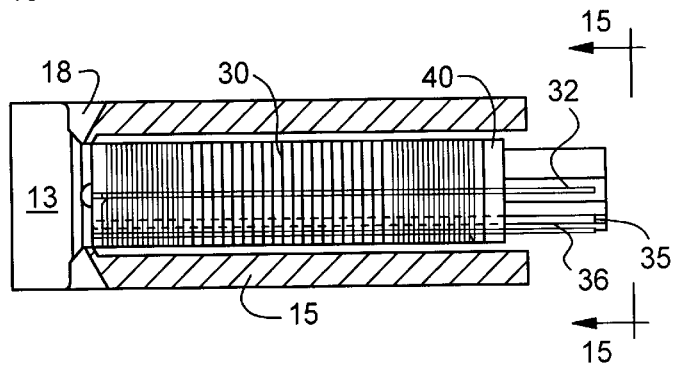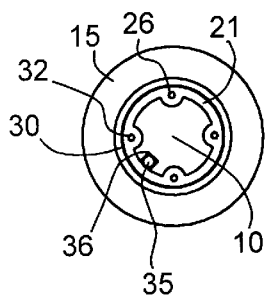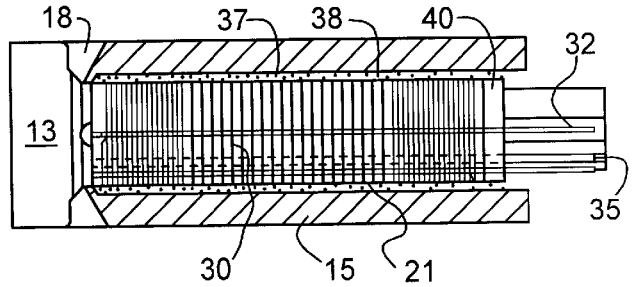

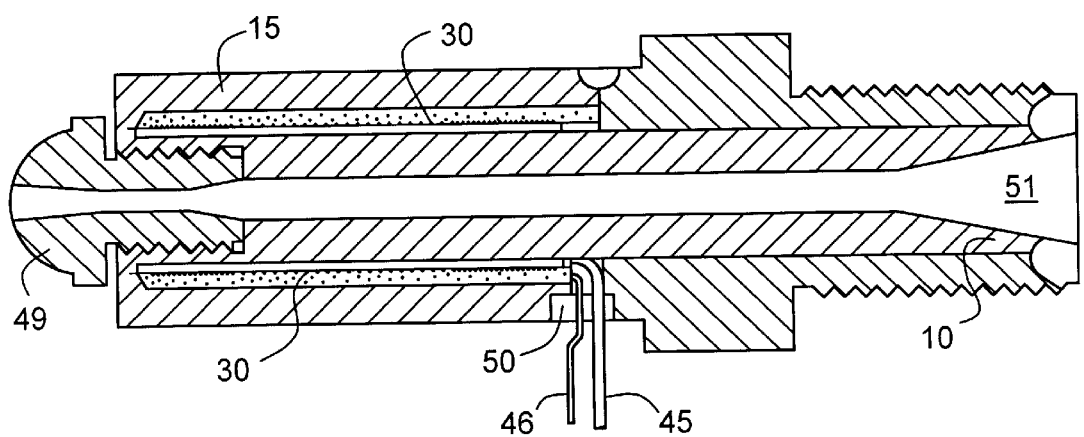

BUSHING AND NOZZLE HEATING DEVICE

BACKGROUND AND SUMMARY OF THE INVENTION

This invention relates to a bushing and nozzle heating device which can be used in forming plastic and other moldable materials, particularly in delivering meld materials to a sprue or into or through a mold at a closely controlled temperature, and the invention also includes a method for making such bushing and nozzle heating devices. Such devices are usable in a wide range of applications, including plastic injection molds and molding machines, die casting machines and dies, and heated glue dispensers.

THE PRIOR ART

A bushing or nozzle heating device is an electrically heated member which is inserted into the gate or flow orifice or sprue or into the delivery stream of a plastic or similar molding systems for maintaining and controlling heat applied to the material which is to be molded. Such a device usually includes an internally electrically heated body integral with a tool steel or similar shell or casing. The internally electrically heated body having a ceramic or similar core about which is wound electrical resistance wire connected to leads extending through the cores projecting outside of the body and connected to a source of electric current. The space inside the casing not occupied by the core and electric components is filled with heat transfer materials, such as magnesium oxide, boron nitride, aluminum oxide or similar material having electrical insulating properties.

The bushing or nozzle may be swaged or rolled or similarly compacted and compressed to pulverize the ceramic core materials and fill the voids within the casing, thus making the molding nozzle or bushing into a dense, solid integral unit, to afford maximum heat transfer characteristics from its internal heating element to the melt stream. One end of the nozzle may be conventionally formed to fit into a gate or sprue or similar surface where inserted. The longitudinal axial center of the device is hollow to comprise a channel to accommodate the melt stream leaving only the leads to exit the nozzle or bushing body.

Such electrically heated nozzle and bushing devices are shown in Walter R. Crandell U.S. Pat. Nos. 4,304,544 and 4,492,556. Such devices are not always capable of use where the melt stream temperature is particularly critical and requires uniformity along its path, as is the case with many modem engineering plastics or where the material running through the device is at high pressure or velocity or where the size of the mold or gate is critical and requires careful lead exit and heat control design or a small size nozzle or bushing to accommodate the delivery situs of the melt stream.

THE NEW BUSHING AND NOZZLE HEATING DEVICE INVENTION

A novel molding bushing and nozzle heating device formed according to the present invention displays great utility, making it possible to use and design new and more efficient and more compact mold designs, available for use with the most modem and sophisticated engineering materials and molded shapes and designs, as well as in conventional molding material systems. This new and improved electrically heated molding bushing or nozzle embodying the present invention is particularly useful in injection molds of the type known as "runnerless" molds, where the plastic or similar material is continuously maintained at molding temperatures within crucial special melt transfer passage entries and exits of the mold, and runners are not ejected from the mold with the molded parts, as distinguished from runner-type molding where the runner is ejected from the mold or trimmed from the molded part at the time of each shot. The entire melt flow path of a runnerless molding system requires optimum temperature uniformity and control. Areas of excessive temperatures within the plastic delivery system and mold burn or cause a more rapid degradation of the melt material. Inadequate heat can also result in blocked or inadequate melt flow, poor molded parts or other weaknesses in the system or parts. Heat uniformity is particularly important at each startup of the tool because existing melt material within the system is in direct contact with the heated surfaces for extended periods of time.

Additionally, such devices are subject to great pressures and velocities. Internal resin pressure are typically in the range of 7,000 to 10,000 p.s.i. and in some cases are even higher. If the bushing or nozzle is not adequately strong, it will break or become deformed frequently shutting down the entire molding operation or doing damage to a mold or molding machine.

The device embodying the present invention is made from a central metal core with one or more grooves in its surface and an interior passage intended for the transfer of heated and liquified materials such as plastic resin or molten metal such as lead solder and zinc. A ceramic core with ribs on its inner bore fits into the grooves of the central metal core and comprises an electrical insulation wall between internal connecting pins of an electrical heating element assembly and the central metal core. The ceramic core is wound with electrical heating wire and contacts the internal connecting pins. A metal cover is attached to the central metal core covering the electrical element heating assembly and forming an annular space between the element wound core and cover. This annular space is filled with high temperature ceramic powder. The entire assembly, including the ceramic core and powder is compacted by a swaging process carried out on the outer cover. Electric leads are attached to the conductor pins to provide a connection to a source of electrical power. Heads or fittings designed to attach or seal the nozzle or bushing device to a molding machines or mold may be secured to the nozzle or bushing wire. A cold core may be placed on an end of the wire wound core over the pins, and a hypodermic type thermocouple well may be inserted along slots coaxial with the wire wound core assembly. Preferably, the resistance wire is wound in spirals having closer spacing at the ends of the core and wider spacing intermediate the core ends. Leads and a thermocouple may exit the side of the assembly where they will not interfere with the meld flow.

The entire nozzle body, with its internal core-wire-thermocouple and well—and lead assembly, may be formed or milled as desired and placed into an aperture arranged in a mold or molding machine or other meld delivery system, and sealed shut. This assembly is preferably swaged to a smaller diameter, thus increasing the density of the ceramic insulation and compressing the components to a solid integral body, with its heat source and temperature control means integrally nested within the nozzle body, so that the assembly has high heat transfer and electrical insulation characteristics and is able to withstand great mold stream pressure without damaging the nozzle or the leads and thermocouple well extending out of the swaged body.

After the novel formed nozzle or bushing device is constructed as describe, it may be inserted into a suitable head or mold body or passage and welded into place. Additional machining can be carried out on the assembly to prepare for its end use. Lead ends can be prepared for lead attachment and the desired leads can be secured remote from the meld stream. The thermocouple can be installed and changed and any desired lead protection can be placed on the completed assembly, as desired. Heads can be cast onto the end of the assembly, if desired.

Because of the novel structure and method described, a molding nozzle having more than one heating zone can be provided, if desired, by merely duplicating and separately controlling the heating and temperature control structure described.

OBJECTS AND ADVANTAGES OF THE INVENTION

The objects and advantages of the invention include the following:

To provide an integrally heated bushing and nozzle device of the character recited.

To provide a method for making such a bushing or nozzle device of the character described.

To provide a bushing and nozzle device which can supply heat throughout a larger portion of the active length of the component than conventional bushings and nozzle devices.

To provide a bushing and nozzle device which can deliver heat by conduction directly to any attached head or channel to be used for meld transfer.

To provide bushing and nozzle devices with integral electric heating means, which can be manufactured in smaller sizes than previously possible while maintaining the high strength required for high meld pressure molding applications, as to permit the use of bushings and nozzles in very small mold and molding machine applications and closer center to center spacing for multi-cavity hot manifold molds.

To provide a bushing and nozzle device with a larger cross-section of metal, thereby improving the strength and longitudinal heat transfer of the device by incorporating grooves in a larger central metal core to accommodate the ceramic insulation which electrically isolates the pins from the central metal core.

To provide a thermocouple well and temperature sensing means which accurately reads the meld flow temperature and is rapidly responsive to changes in temperature for maintaining the temperature of the bushing and nozzle devices, as desired.

To provide for a reliable bushing and nozzle device which is very strong and usable at very high meld pressures.

To provide bushing and nozzle device arrangements which can be conveniently and effectively secured, machined and welded into gate and mold structures.

To provide one piece bushing and nozzle devices which have integral electric heating means encapsulated into protective metal body parts.

To provide a novel one piece bushing and nozzle device which can be divided into different heat zones.

To provide bushing and nozzle devices which are efficient in use and can be made according to a method which is simple, economical and efficient to perform.

These and other objects and advantages of the invention will become more apparent as this description proceeds, taken in conjunction with the accompanying drawings.

BRIEF DESCRIPTION OF THE DRAWINGS

In the drawings:

FIGS. 1–22 are a series of sketches, each showing a successive step in the performance of the method embodying the present invention for the manufacture of the novel structure disclosed in this application, as follows:

FIG. 1 is a side elevational view of a central metal core for a device embodying the present invention.

FIG. 2 is a sectional view of the central core taken at right angles to FIG. 1 on line 2—2 of FIG. 1.

FIG. 3 is a side elevational view of the metal cover, with its interior shown in dotted lines.

FIG. 3a is a sectional view of the cover shown in FIG. 3, taken on line 3a—3a of FIG. 3.

FIG. 4 is a cross-sectional view of the assembly of the core shown in FIG. 1 and the cover shown in FIG. 3 placed thereover.

FIG. 5 is a cross-sectional view of the FIG. 4 assembly, with the core and cover welded together.

FIG. 6 is a cross-sectional view of the FIG. 5 assembly, with the weld machined to the diameter of the cover.

FIG. 7 is a side elevational view of the crushable ceramic core for the nozzle and bushing embodying the invention.

FIG. 8 is a end view of the ceramic core taken at right angles to FIG. 7 on line 8—8 of FIG. 7.

FIG. 9 is an elevational view of the core shown in FIGS. 7 and 8. wound with electrical resistance wire.

FIG. 10 is a side elevational view of the wire wound core shown in FIG. 9 with conductor pins attached.

FIG. 11 is a side elevational view similar to FIG. 10, with a cold core attached to one end of the assembly.

FIG. 12 is a end elevational view of the wound core shown in FIG. 11, taken on line 12—12 of FIG. 11.

FIG. 13 is a sectional view of the cover and metal core assembly and an elevational view of the wire wound ceramic core assembly shown during insertion of the ceramic core assembly into the metal core and cover assembly.

FIG. 14 is a view of the assemblies shown in FIG. 13 fully installed, with a thermocouple well shown in dotted lines.

FIG. 15 is an end view of the assembly shown in FIG. 14, taken on line 14—14 of FIG. 14.

FIG. 16 is a sectional view of the FIG. 14 assembly with its thermocouple tube inserted along the metal core groove and with the space between the metal core and cover assembly filled with granular ceramic powder.

FIG. 17 is a sectional view of the FIG. 14 assembly, with the wire wound ceramic core assembly shown in elevational view, and with its open end sealed shut.

FIG. 18 is a view similar to FIG. 17, with the assembly swaged to a lesser diameter.

FIG. 19 is a view of the swaged assembly similar to FIG. 18, but trimmed and shaped to a desired configuration.

FIG. 20 is a cross sectional view showing a swaged core-cover assembly like that illustrated in FIG. 19, with a head and leads installed exiting at desired locations.

FIG. 21 is a sectional view of the finished formed nozzle and bushing embodying the present invention, welded into a suitable mold head, with lead arrangements installed, machined to remove weld residue and shaped as desired, and showing its formed flow channel entry and orifice.

FIG. 22 is a sectional view of another typical bushing or nozzle embodying the present invention, with leads attached and thermocouple inserted into the thermowell, a lead protector disc, and orifice installed.

DESCRIPTION OF PREFERRED EMBODIMENTS

Figure 17:
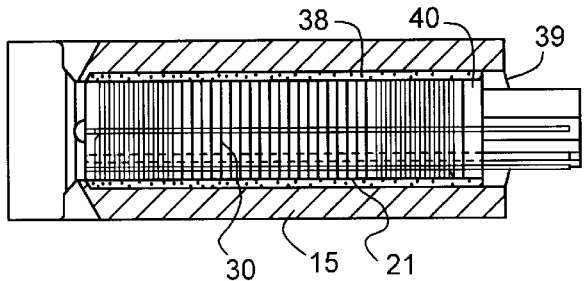
Figure 20:
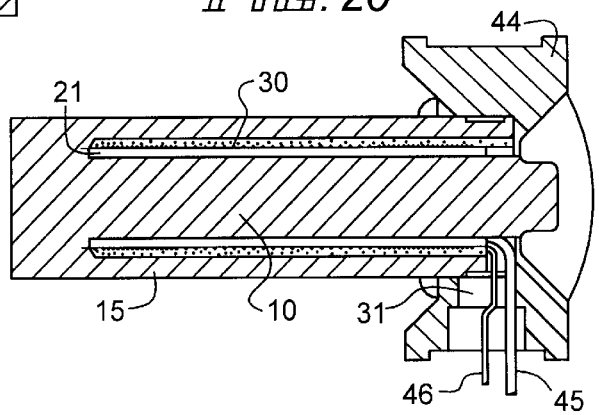
Figure 18:
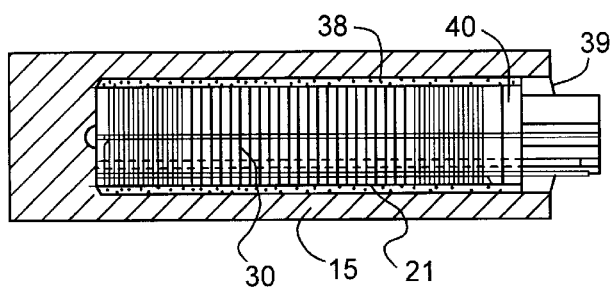
Figure 21:
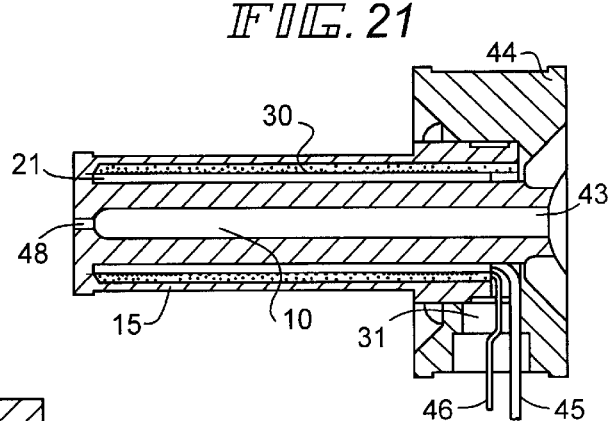
Figure 19:
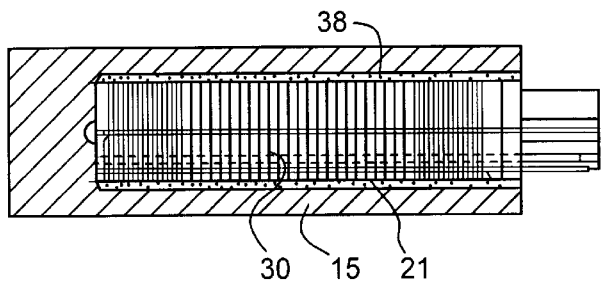

With reference to the accompanying drawings and particularly to FIGS. 1 through 16, respectively, where in FIGS. 1 and 2, a central metal core 10 formed to a desired length is axially slotted with one or more parallel grooves 11 extending its length. An additional groove 12 may be machined into the core 10 to accommodate later installation of a thermocouple or other sensor device. Preferably, this metal core 10 has a base 13 on which is arranged one or more stops 14 for easy handling of the assembly as it is fabricated.

An outer metal cover 15, preferably having an diameter corresponding to the diameter of the metal core base 13, is fabricated with an inner recess 16 having a shoulder 17 (shown in dotted lines) adapted to fit over the core 10 and when assembled (as shown in FIG. 4) to bear against the core stops 14 of the base 13. As shown in FIG. 5, the metal portions of the assembly, comprising the metal core 10 and the cover 15, are unitized by welding 18 at the periphery 19 of the inside wall of the base 13 at the stops 14, and the cover shoulder 17, whereupon the bulge 20 of the weld 18 is removed.

A crushable ceramic core 21, illustrated in FIGS. 7 and 8, is cut to a desired length; and this ceramic core 21 has a central axial opening 22. So that this ceramic core when completed with its windings can fit in the radial space between the assembled metal core 10 and its cover 15, this core 21 has a wall 23 which is less than the radial space between the assembled metal core and cover. Splines 24 on the ceramic core 21 corresponding to the grooves 11 in the metal core 10 will permit this ceramic core 21 to be slipped into and positioned in the radial space between the assembled metal core and cover. Preferably this ceramic core 21 has a slot 25 at its end which communicates with at least one of the holes 26 running the entire length of the ceramic core.

Element wire 30 is then wound on the ceramic core 21, with the wire end looped into opposite ends of two of the holes 26, whereupon conductor pins 32 are inserted into the holes making mechanical contact with the element wire 30 looped into the respective relevant holes. A cold core 40 is then slipped over the conductor pins 32 and pushed into contact with the wire wound core 21. Preferably, the windings 33 of the element wire 30 adjacent each end of the ceramic core 21 are spaced closer together than the central windings 34 in the vicinity of the center of the ceramic core 21.

When the assembly of ceramic core 21, element wire 30 and conductor pins 32 described above is completed, this assembly is slipped into the radial space between the welded metal core 10 and cover 15 assembly.

After seating the wire wound core 21 into the radial space between the metal core 10 and cover 15 assembly as shown in FIG. 14, a hypodermic needle type thermocouple well 35 is installed in the groove 36 provided in the central metal core 10 and is held in the proper radial position by the ceramic core 21 which surrounds groove 36. The voids 37 around and within the assembly are filled with granular ceramic powderlike fill material 38 and the lead end of the assembly is then sealed shut with plastic sealant 39, such as hot melt glue, or a plastic disc, as shown in FIG. 17. This plastic sealant 39 temporarily secures the conductor pins 32 and hypodermic needle type thermocouple well 35 in the desired longitudinal position.

The assembly is then swaged to a smaller diameter to increase the internal density of the ceramic insulation and components. This swaging process creates a solid integral body having high heat transfer characteristics and also secures the embedded element wire 30, conductor pins 32 and thermocouple well 35 in the desired selected permanent position. Additionally, the compression of the components improves the metal components by reducing pits and inclusions within the welds and machined parts, providing a more solid body.

This swaged assembly is trimmed at its lead end 31 to remove the sealant 39 and provide a trim end 41, to establish the desired dimensional relationship from the cover or base end 27 of the assembly, and to the heating source comprising the embedded ceramic core 21 wound with resistance wire 30, as discussed. The cover 15 can be lathe turned to true the outside diameter surface 42 of the bushing or nozzle, whereupon it may be prepared for the addition of any desired head or other fittings.

The longitudinally arranged melt stream passage 43 may be bored into the central metal core 10 to provide a passage for the delivery of molten material through the nozzle. A head 44 of a desired configuration may be secured to the swaged nozzle or bushing assembly. The leads 45 and thermocouple 46 can be installed as described and shaped as required, exiting the assembly at a selected desired position remote from the melt stream passage 43 where they will not interfere with the installation, operation or servicing of the bushing or nozzle. The head 44 may be welded into position with heavy weldment material or otherwise secured into the mold or sprue.

This head 44 and swaged nozzle or bushing assembly may be machined into its final precision configuration and other flow channels and securing structure can be formed in association with the novel structure of the present invention, such as an injection head 47 or needle-like tip 48 structure, as shown in FIG. 22. These special injection molding machine nozzles may be provided with threaded tips 49, protected lead and thermocouple exits 50, as well as with venturi-like flow passages 51 construction.

Such a new and novel integral bushing or nozzle construction provides a core arrangement which a larger cross-section of structure metal, which dramatically improves the strength of the part, improves thermal conductivity and longitudinal heat uniformity in its flow passage. The insulation wall of the present design is reduced without reducing electrical insulation values, resulting in improved heat transfer rates, thus reducing internal operating temperatures and improving thermal response. The internal hypodermic needle type thermowell is located within a groove in the central metal core, which improved response and control of temperature of the melt transfer passage within the metal core, to more directly measure and control the temperature of the melt stream, rather than just the temperature of the resistance wire. The internal lead pins and hypodermic tube style thermowell recessed in the central metal core provide mechanical protection for these components, not only during machine and welding operations, but also during servicing of the parts, thus reducing the potential for pin and tube damage during manufacture or after the parts are in the field.

While preferred embodiments of the invention have been shown and described in considerable detail, it is not desired that the invention should be limited to the exact construction described or shown, as many changes and variations in the method and structure taught can be made without departing from the spirit or scope of the invention.

I claim:

1. An integral heated molding nozzle device for maintaining at a controlled elevated temperature material passing through an orifice therein, said device comprising, in combination:
   (a) an electrical heating element,
   (b) lead wires extending from said heating element electrically connecting said heating element to a power source,
   (c) a heat conductive nozzle body, said body
      (i) having said orifice axialy arranged in said body surrounded by said heating element in heat transfer relation with said heating element,
      (ii) said heating element adapted to effect direct heat transfer to said orifice from said heating element,
   (d) said lead wires exiting said body remote from said orifice,
   (e) said body comprising
      (i) a central heat transfer core through which said orifice extends,
      (ii) a ceramic core surrounding said central heat transfer core,
      (iii) a length of resistance wire windings on said ceramic core, and
      (iv) a cover overlying said cores,
   (f) said body containing electrical insulating material surrounding said heating element for electrically insulating said heating element from said body, and
   (g) interfitting corresponding groove and rib means extending axially in the direction of intended flow of material passing through said nozzle body, and said interfitting corresponding groove and rib means are on an outer surface of said central heat transfer core and an inner surface of said ceramic core to correspondingly interfit said central heat transfer core and said ceramic core.

2. The integral heated molding device of claim 1, wherein the wind of resistance wire are closer together at the ends of said ceramic core than between said ends.

3. The integral heated molding device of claim 1, wherein said central core and said ceramic core are secured together by said interfitting corresponding groove and rib means.

4. The integral heated molding device of claim 1, wherein said ceramic core has a plurality of longitudinal apertures and the ends of said resistance wire are received therein.

5. The integral heated molding device of claim 4, wherein lead pins are connected to said resistance wire ends in said apertures.

6. The integral heated molding nozzle device of claim 1, wherein a thermocouple well is secured in a channel in said nozzle body and a thermocouple is seated in said thermocouple well.

7. The integral heated molding device of claim 6, wherein said thermocouple well is positioned between said central core and said ceramic core.

8. The integral heated molding device of claim 6, wherein said thermocouple is coextensive with said ceramic core.

9. The integral heated molding device of claim 1, wherein said central core has a base member at one end thereof having a diameter greater than the diameter of said ceramic core and substantially the diameter of said cover and said base acts as a stop for a related end of said ceramic core and cover.

10. The integral heated molding device of claim 9, wherein said central core and said cover are secured together at said base, and said ceramic core is nested between said central core and cover.

11. The integral heated molding device of claim 9, wherein said body has an open end remote from said base and a cold core is inserted in said open end.

12. The integral heated molding device of claim 11, wherein said open end is closed with sealant.

13. The integral heated molding device of claim 15, wherein one of said corresponding ribs being located at the same radial location as at least one of said lead wires.

14. The integral heated molding device of claim 13, where said one corresponding rib extends from said ceramic core and consists of primary electrical insulation between said lead and said central core.

15. In an integral heated molding bushing and nozzle device having a heat conductive nozzle body, said body having an inlet and an outlet defining an orifice for heated material passing there through, said body comprising a heat conductive central metal core having an outer and inner surface, a ceramic core having an outer and inner surface and surrounding said outer metal core surface, a heating element on said ceramic core, said orifice extending through said metal core inner surface in heat transfer relation with said cores, the improvement comprising:
    interfitting corresponding grooves and ribs on said cores extending substantially the axial length of said nozzle, said interfitting corresponding grooves and ribs being spaced around said outer metal core surface and said ceramic core inner surface;
    and said interfitting corresponding grooves and ribs extending in the direction of intended flow of material passing through said nozzle body.

16. The integral heated molding device of claim 15, wherein said body has a cover and is compacted to place said central core, ceramic core and cover in intimate heat transfer relation with one another by swaging said body to a reduced diameter.

17. The integral heated molding device of claim 15, wherein said central core has an axial bore longitudinally extending its length surrounded by a wire wound ceramic core and defining the internal orifice for passage of molten material.

18. The integral heated device of claim 17, wherein a molding head is secured to one end of said body.

19. The integral heated device of claim 18, wherein a nozzle tip communicating with said orifice is formed into an end of said body remote from said molding head.

20. The integral heated device of claim 18, wherein leads exit said body remote from said molding head.

21. The integral heated device of claim 20, wherein heat sensor means exits said body remote from said molding head.

22. The integral heated device of claim 15, wherein said ceramic core is wound with resistance wire, and said ceramic core has an outer surface containing a plurality of axial apertures in said ribs, said apertures extending substantially the entire axial length of said ceramic core.

23. The integral heated device of claim 22, wherein a plurality of conductor pins fixedly attach in said apertures to said resistance wire, said conductor pins extending substantially the axial length of said ceramic core outer surface.

24. The integral heated device of claim 23, wherein lead wires are connected to said conductor pins connecting to a power source.

25. The integral heated device of claim 24, wherein said lead wires exit said body remote from said inlet and outlet.

* * * * *